US006764045B2

(12) United States Patent
Sternberger

(10) Patent No.: US 6,764,045 B2
(45) Date of Patent: Jul. 20, 2004

(54) BI-FOLD THRUST REVERSER DOOR ASSEMBLY

(75) Inventor: Joe E. Sternberger, Wichita, KS (US)

(73) Assignee: The Boeing Company, Seattle, WA (US)

(*) Notice: Subject to any disclaimer, the term of this patent is extended or adjusted under 35 U.S.C. 154(b) by 22 days.

(21) Appl. No.: 10/136,972

(22) Filed: Apr. 30, 2002

(65) Prior Publication Data

US 2003/0201364 A1 Oct. 30, 2003

(51) Int. Cl.[7] ............................................. B64D 33/04
(52) U.S. Cl. ......................... 244/110 B; 239/265.29; 239/265.31; 60/226.2
(58) Field of Search ................. 244/110 B; 239/265.29, 239/265.31, 265.19; 60/226.2

(56) References Cited

U.S. PATENT DOCUMENTS 4,047,682 A * 9/1977 Brownhill ............... 244/110 B
4,894,985 A * 1/1990 Dubois et al. .......... 239/265.29
5,120,004 A * 6/1992 Matthias ................. 239/265.29
6,079,201 A   6/2000 Jean

* cited by examiner

Primary Examiner—Galen L. Barefoot
(74) Attorney, Agent, or Firm—Black Lowe & Graham PLLC

(57) ABSTRACT

An aircraft engine thrust reverser includes a bi-fold door having a first panel pivotally attached to a nacelle and a second panel hingedly connected to the first panel. The second panel is slidingly received within a pair of tracks disposed within the nacelle. A compression link provides mechanical communication between the second panel and an efflux control assembly such that the bi-fold door is hingedly openable when slidingly urged along the tracks when the compression link responds to the efflux control assembly.

20 Claims, 3 Drawing Sheets

BI-FOLD THRUST REVERSER DOOR ASSEMBLY

FIELD OF THE INVENTION

This invention relates generally to aircraft engine thrust reversers and, more specifically, to door assemblies for aircraft engine thrust reversers.

BACKGROUND OF THE INVENTION

Thrust reversers are used to supplement stopping power of brakes on jet aircraft by reversing, or reducing, forward thrust generated by a jet engine. However, the range of different jet aircraft to which any given thrust reverser currently known is the art is somewhat limited because of currently known door assemblies. More specifically, the door assemblies employed by current thrust reversers limit the use of the thrust reverser to unobstructed engine regions. This is because movement of the doors requires too much space for use in obstructed engine regions. For example, industry standard transmitting sleeve type thrust reversers require the path of the translating sleeve to be free from any external or internal obstructions. Also, the shape of the aircraft engine's external aerodynamic surface may not have the sloped surface generally required for a translating sleeve thrust reverser. Therefore, use of translating sleeve type thrust reversers is generally limited in application to aircraft having wing-mounted engines, and some tail mounted engines, because such applications have a relatively unobstructed region.

New developments in aircraft design anticipate jet engine placement in a variety of areas including, but not limited to, an under wing arrangement. For example, engines may be mounted on the tail where the vertical and horizontal stabilizers create obstructed engine regions. Similarly, blended aircraft designs incorporate the engine nacelle as an integral part of the airframe. This design can obstruct several engine regions. These obstructions can additionally limit or prevent entirely employment of standard translating sleeve type thrust reverser doors.

Therefore, there is an unmet need in the art for a thrust reverser design employable in regions of an aircraft engine where structural impediments prevent the use of current industry standard thrust reverser designs.

SUMMARY OF THE INVENTION

The present invention provides a system and method for providing thrust reversal in obstructed regions of an aircraft engine. The bi-fold door assembly permits thrust reversal in the otherwise inaccessible, obstructed regions of an aircraft engine. Consequently, a more consistent and evenly distributed air flow path is achieved around the engine. Additionally, as a greater overall thrust reversal region is attainable, a greater thrust reversal force may be achieved, which may decrease aircraft stopping distance or otherwise limit the need for other braking force systems.

An aircraft engine thrust reverser includes a door having a first panel pivotally attached to a nacelle and a second panel hingedly connected to the first panel. The second panel is slidingly received within a pair of tracks disposed within the nacelle. A compression link provides mechanical communication between the second panel and an efflux control assembly such that the bi-fold door is hingedly openable when slidingly urged along the tracks when the compression link responds to the efflux control assembly.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
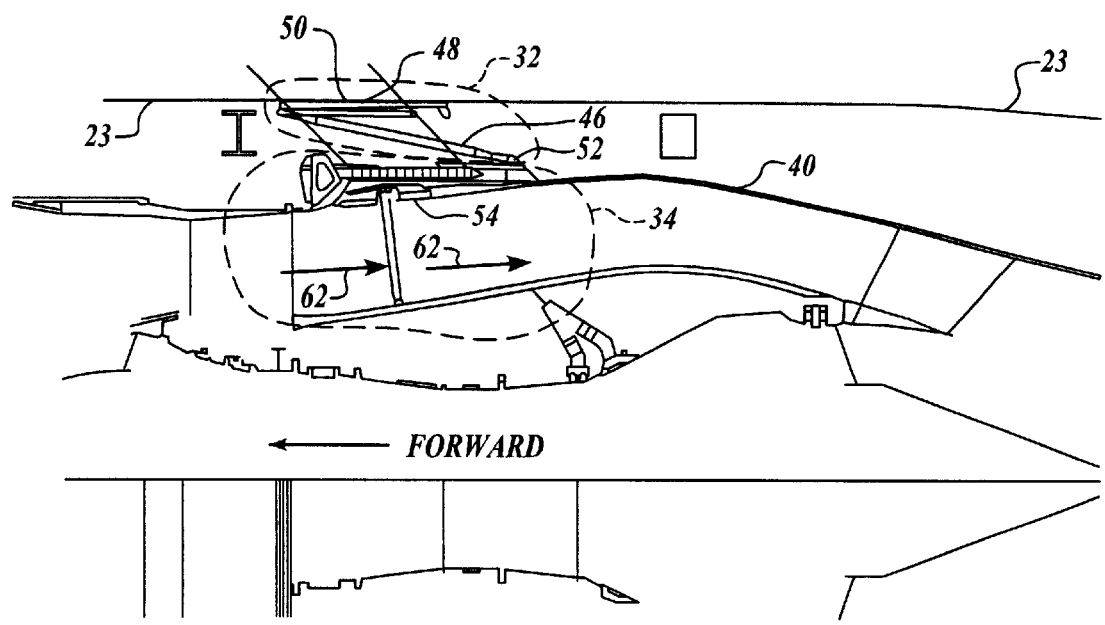
FIG. 1 is partial side view of a bi-fold door assembly in a stowed position in accordance with the present invention.

The present invention provides a system and method for admitting thrust reversers in areas that have structural impediments otherwise preventing employment of a standard translating sleeve or other similar thrust reverser design. By way of overview, and with reference to FIGS. 1–3, one presently preferred embodiment of the present invention includes a thrust reverser arrangement 20 for an aircraft engine. A bi-fold door assembly 32 is in communication with an efflux control assembly 34. Operation of the bi-fold door assembly 32 is controlled by the efflux control assembly 34. The bi-fold door assembly 32 includes a door 48 operating in door tracks 50. A compression link 46 couples the door 48 to a translating panel 40 of the efflux control assembly 34. As such, the relative motion of the translating panel 40 determines the state of the door 48. The bi-fold door arrangement 32 permits reversal of fan duct flow 58 in otherwise limited areas due to interfering structure 38. Specific details of the bi-fold door thrust reverser arrangement 20 are described in more detail below.

Figure 2:
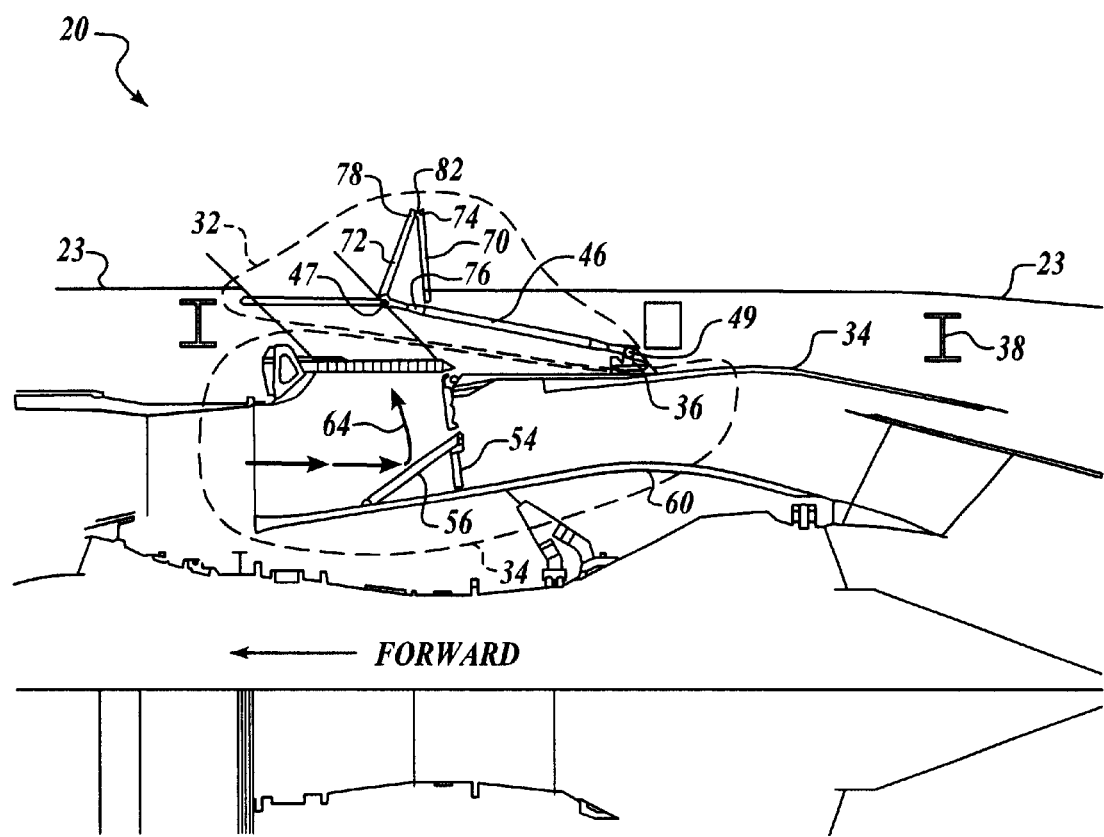
FIG. 2 is a is partial side view of a bi-fold door assembly in a translated position in accordance with the present invention.
Figure 3:
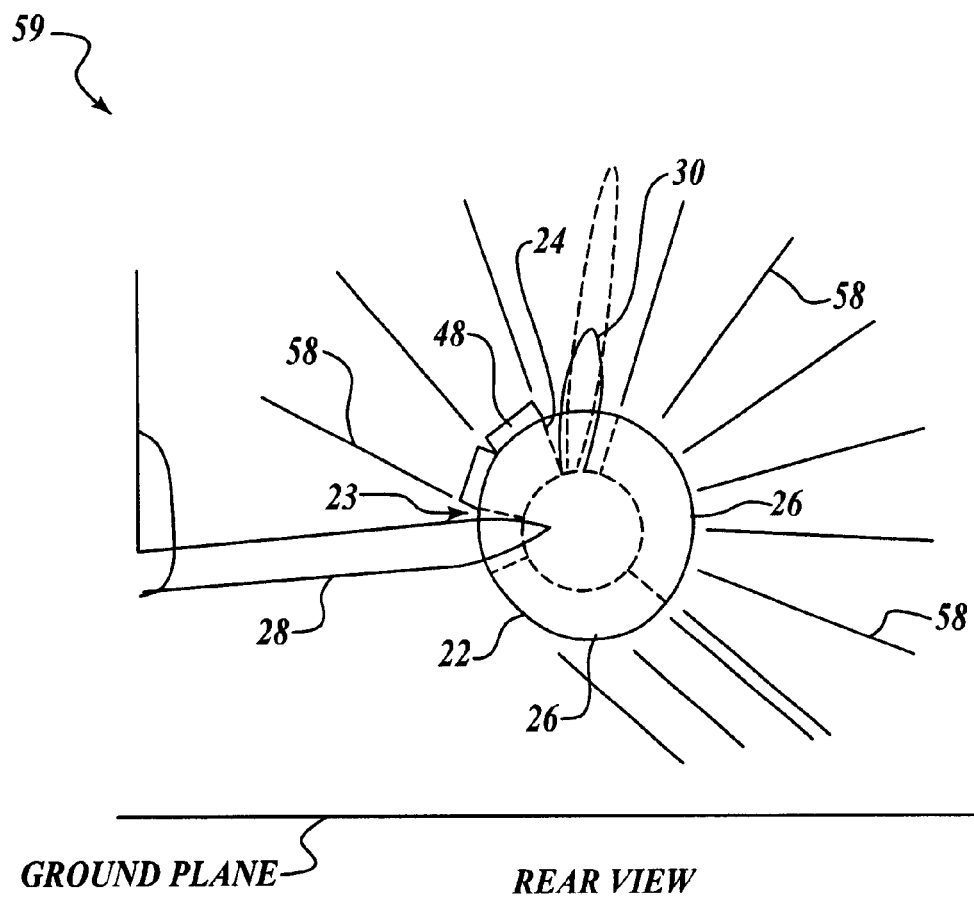
FIG. 3 is a frontal view of an embodiment of the present invention.

Referring now to FIGS. 1–3, a presently preferred bi-fold door thrust reverser arrangement 20 is shown that is employable in an obstructed region 24 of an aircraft engine 22. It will be appreciated that translating sleeve thrust reversers are well known in the art. Also well known in the art are components and structure used with the present invention, such as without limitation a blocker door 54, cascades 44, a translating panel 36, and other components of the efflux control assembly 34. It will also be appreciated that the function, related motion and actuation of translating sleeve thrust reversers are also well known in the art. As a result, an explanation of details of the surrounding structure, components, and their motion is not necessary for understanding the invention.

The engine 22 includes a nacelle 23 encompassing the efflux control assembly 34. The efflux control assembly 34 includes a fan duct 59, the blocker door 54, a drag link 56, the translating panel 40, and the cascades 44. The fan duct 59 defines a first fan duct path 62 (FIG. 1) and a second fan duct path 64 (FIG. 2). The blocker door 54 is hingedly configured to direct air flow between the first fan duct path 62 and the second fan duct path 64. The first fan duct path 62 correlates to a normal, forward engine thrust conditions. Conversely, the second fan duct path 64 correlates to a thrust reverser condition, such as is commonly employed after an aircraft lands.

The bi-fold door assembly 32 of the present invention includes a door 48 having first and second panels 70 and 72, respectively. The first panel 70 has a first end 74 and a second end 76. The second panel 72 has a first end 78 and a second end 80. The first panel 70 and the second panel 72 are hingedly attached to each other at their first ends 74 and 78, respectively. Additionally, the second end 76 of the first panel 70 is hingedly attached to the nacelle 23. A pair of tracks 50 is disposed within the nacelle 23, wherein the second end of the second panel 80 is slidably received within the tracks 50.

A compression link 46 has a first end and a second end 47 and 49, respectively. The first end 47 of the compression link 46 is hingedly attached to the second end 80 of the second panel 72. The second end 49 of the compression link 46 is hingedly connected to the to the efflux control assembly 34. More specifically, the second end 49 of the compression link 46 is connected to a fitting 52 disposed on the translating panel 40 of the efflux control assembly 34. The compression link 46 is extendable from a first state of compression, as shown in FIG. 1, to a second state of compression, as shown in FIG. 2, that is less than the first state of compression. The door 48 is hingedly openable when slidably urged along the tracks 50 when the compression link 46 is in the second state of compression responsive to the efflux control assembly 34.

In one presently preferred embodiment, the first end of the first panel 74 and the first end of the second panel 78 are connected by a pair of hinges. However, it will be appreciated that other hinge or other pivotable joints commonly known in the art is considered within the scope of this invention.

The compression link 46 is suitably a telescoping rod. Any other structure known in the art is employable as a compression link 46, such as, without limitation, a coil spring or spring and damper arrangement (not shown). Further, if desired, the compression link 46 may optionally include a biasing element (not shown), such as a spring, to bias the door 48 in the closed position to prevent unwanted movement of the door 48. In a presently preferred embodiment, the biasing element (not shown) is internally mounted within the compression link 46. However, other biasing configurations are considered within the scope of this invention, such as, without limitation, an externally mounted biasing element (not shown).

Referring now to FIGS. 1 and 2, one presently preferred embodiment of the bi-fold door assembly 32 is shown in a stowed position and a translated position, respectively. The transition from the forward engine thrust condition to a thrust reverser condition is suitably controlled by an industry standard Thrust Reverser Actuation System (TRAS) (not shown). Upon actuation of the TRAS, the efflux control assembly 34 directs the translating panel 40 to move in an aft direction, thereby exposing the cascades 44. At about the same time, the blocker door 54 moves from a first position that defines the first fan duct path 62 to a second position that defines the second fan duct path 64. This reverses the thrust by directing the fan air radially outwardly and slightly forward through the cascades 44.

In operation, movement of the bi-fold door assembly 32 is controlled by the efflux control assembly 34. When the bi-fold door thrust reverser arrangement 20 is in a stowed position as depicted in FIG. 1, the translating panel 40 is in a forward position. The compression link 46 is in a first state of compression, which closes the door 48. When the thrust reverser is actuated, as depicted in FIG. 2, the translating panel 40 correspondingly moves aft. The movement of the translating panel 40 causes a corresponding opening of the bi-fold door assembly 32.

Referring now to FIG. 3, one presently preferred thrust reverser arrangement 59 is illustrated. More specifically, the engine 22 is attached to a wing structure 28 and a stabilizer structure 30. The wing structure 28 and the stabilizer structure 30 divide the engine 22 into obstructed regions 24 and unobstructed regions 26. The bi-fold door assembly 32 is employed in the obstructed regions 24, and a standard translating sleeve (not shown) is employed in the unobstructed regions 26. As will be appreciated by those skilled in the art, a standard translating sleeve type thrust reverser (not shown) currently known in the art is not able to be deployed in any obstructed regions 24 due to translating space requirements.

The present invention replaces the translating sleeve (not shown) with the bi-fold door assembly 32. It will be appreciated that the bi-fold door assembly 32 is employable in either an obstructed region 24 or an unobstructed region 26 of an aircraft's engine. When employing both the bi-fold door assembly 32 and a standard translating sleeve, the bi-fold door assembly 32 is suitably coupled to the translating sleeve assembly by any known means, such as, without limitation, a flexible synchronization shaft (not shown).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A thrust reverser door assembly for a jet engine, the engine having an efflux control assembly and a nacelle, the assembly comprising:

a door having first and second panels each having first and second ends, the first and second panels being hingedly attached to each other at their first ends, the second end of the first panel being hingedly attached to the nacelle;

a pair of tracks disposed within the nacelle, the second end of the second panel being slidably received within the tracks; and a compression link having a first end and a second end, the first end of the compression link being hingedly attached to the second end of the second panel, the second end of the compression link being hingedly attached to the efflux control assembly, the compression link being extendable from a first state of compression to a second state of compression that is less than the first state of compression, the door being hingedly openable when slidingly urged along the tracks when the compression link is in the second state responsive to the efflux control assembly.

2. The door assembly of claim 1, wherein the compression link further comprises a biasing member configured to bias the door closed when the compression link is in the first state of compression.

3. The door assembly of claim 2, wherein the biasing member is a spring.

4. The door assembly of claim 1, wherein the compression link is a telescoping rod.

5. The door assembly of claim 1, wherein the door assembly is employed in an obstructed region of an aircraft engine.

6. The door assembly of claim 1, wherein the door assembly is employed in an unobstructed region of an aircraft engine.

7. A thrust reverser assembly for a jet engine having an obstructed region and an unobstructed region, the jet engine having an efflux control assembly and a nacelle, the assembly comprising:

a first thrust reverser mounted with an obstructed region of a jet engine, the first assembly including:
    a first door having first and second panels each having first and second ends, the first and second panels being hingedly attached to each other at their first ends, the second end of the first panel being hingedly attached to a nacelle;
    a pair of tracks disposed within the nacelle, the second end of the second panel being slidably received within the tracks; and
    a compression link having a first end and a second end, the first end of the compression link being hingedly attached to the second end of the second panel, the second end of the compression link being hingedly attached to the efflux control assembly, the compression link being extendable from a first state of compression to a second state of compression that is less than the first state of compression, the first door being hingedly openable when slidingly urged along the tracks when the compression link is in the second state responsive to the efflux control assembly; and
    a second thrust reverser mounted with an unobstructed region of a jet engine, the second thrust reverser including a second translating door.

8. The thrust reverser assembly of claim 7, wherein the first thrust reverser further includes a biasing member configured to bias the first door closed when the compression link is in the first state of compression.

9. The thrust reverser assembly of claim 8, wherein the biasing member is a spring.

10. The thrust reverser assembly of claim 7, wherein the compression link includes a telescoping rod.

11. A method of reversing thrust from a jet engine having an efflux control assembly and a nacelle, the method comprising:
    providing a door having first and second panels, each of the first and second panels having first and second ends, the first and second panels being hingedly attached to each other at their first ends, the second end of the first panel being hingedly attached to the nacelle;
    disposing a pair of tracks within the nacelle, the second end of the second panel being slidably received within the tracks; and
    compressing a compression link having a first end and a second end, the first end of the compression link being hingedly attached to the second end of the second panel, the second end of the compression link being hingedly attached to the efflux control assembly, the compression link being extendable from a first state of compression to a second state of compression that is less than the first state of compression, the door hingedly opening when slidingly urged along the tracks when the compression link is in the second state responsive to the efflux control assembly.

12. The method of claim 11, further comprising biasing the door closed with a biasing member with the door is in the compression link first state of compression.

13. The method of claim 12, wherein biasing the door includes providing a spring.

14. The method of claim 11, wherein compressing the compression link further includes telescoping a rod.

15. A jet engine comprising:
    an efflux control assembly;
    a nacelle; and
    at least a first thrust reverser:
        a door having first and second panels, each of the first and second panels having first and second ends, the first and second panels being hingedly attached to each other at their first ends, the second end of the first panel being hingedly attached to the nacelle;
        a pair of tracks disposed within the nacelle, the second end of the second panel being slidably received within the tracks; and
        a compression link having a first end and a second end, the first end of the compression link being hingedly attached to the second end of the second panel, the second end of the compression link being hingedly attached to the efflux control assembly, the compression link being extendable from a first state of compression to a second state of compression that is less than the first state of compression, the door hingedly opening when slidingly urged along the tracks when the compression link is in the second state responsive to the efflux control assembly.

16. The jet engine of claim 15 further comprising:
    an obstructed region; and
    an unobstructed region.

17. The jet engine of claim 16, further comprising:
    a second thrust reverser mounted within the unobstructed region, the second thrust reverser including a second translating door.

18. The jet engine of claim 17, wherein the first thrust reverser is mounted within the obstructed region.

19. The jet engine of claim 17, wherein the first thrust reverser further includes a biasing member configured to bias the first door closed when the compression link is in the first state of compression.

20. The jet engine of claim 19, wherein the biasing member includes a spring.

* * * * *